(No Model.)
J. H. SAVILL.
COUPLING FOR WATER CLOSETS.
No. 526,089. Patented Sept. 18, 1894.
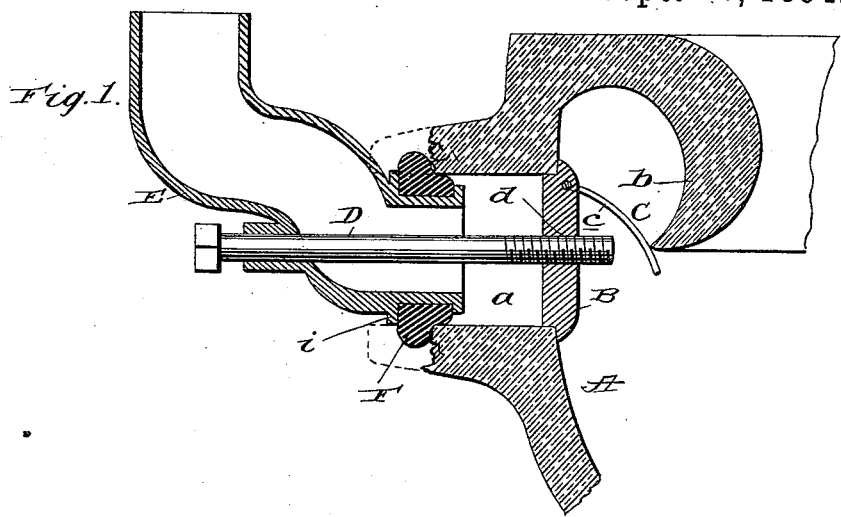
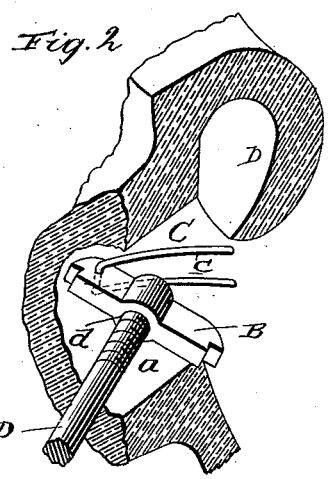
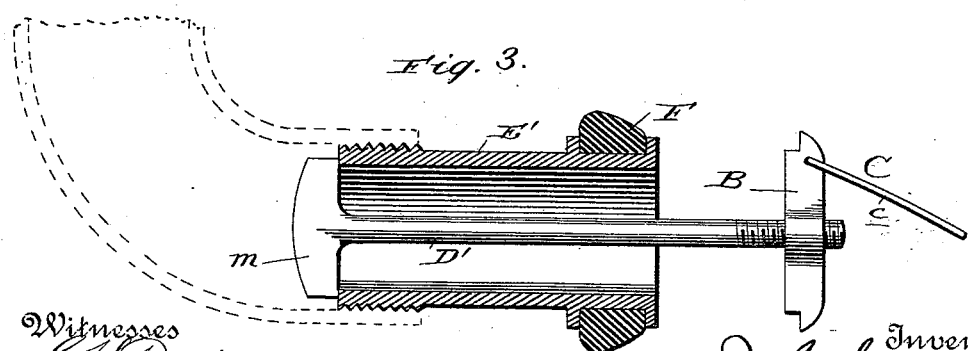

UNITED STATES PATENT OFFICE.

JOSEPH H. SAVILL, OF PHILADELPHIA, PENNSYLVANIA.

COUPLING FOR WATER-CLOSETS.

SPECIFICATION forming part of Letters Patent No. 526,089, dated September 18, 1894.

Application filed May 7, 1894. Serial No. 510,382. (No model.) Patented in Canada July 4, 1894, No. 46,470.

*To all whom it may concern:*

Be it known that I, JOSEPH H. SAVILL, a citizen of the United States, residing at Philadelphia, in the county of Philadelphia and State of Pennsylvania, have invented certain new and useful Improvements in Couplings for Water-Closets, (for which I have obtained Letters Patent in Canada, No. 46,470, dated July 4, 1894;) and I do declare the following to be a full, clear, and exact description of the invention, such as will enable others skilled in the art to which it appertains to make and use the same.

My invention relates to improvements in couplings for connecting pipe sections to water closet bowls or hoppers; and it is designed more particularly as an improvement upon the coupling disclosed in my prior application, Serial No. 492,138, which coupling is designed and adapted to effect a yielding connection of a pipe section to the boss or arm of a bowl or hopper so as to prevent the boss or arm from being broken off in case the bowl is jarred or sinks from any cause.

The general object of my present invention is to provide a coupling through the medium of which a yielding connection may be readily effected between a pipe section and a water closet bowl or hopper from which the boss or arm has been broken off; and with this end in view, the invention will be fully understood from the following description and claims when taken in connection with the annexed drawings, in which—

Figure 1, is a sectional view illustrating my improved coupling as connecting a pipe section to a water-closet bowl or hopper from which the boss or arm has been broken off. Fig. 2, is a perspective view, partly in section, illustrating the manner in which the bearing or nut is introduced to its position. Fig. 3, is a sectional view illustrating a modified construction.

Referring by letter to said drawings, and more particularly to Figs. 1, and 2, thereof:— A, indicates a porcelain water-closet bowl from which the boss or arm has been broken off, and B, indicates the bearing or nut of my improved coupling. This bearing or nut B, is designed and adapted to be inserted through the opening $a$, of the bowl to a position between the body of the bowl and the flushing rim $b$, thereof, and it is provided with a spring as C, which is designed and adapted to engage the edge of the flushing rim when the bearing or nut has been inserted, so as to press the said nut or bearing against the inner side of the bowl or hopper and hold it in such position to receive the threaded bolt or rod D, (presently described.)

The spring C, may be of any construction that is adapted to perform the function just described, but I prefer in practice to make it of a single piece of spring wire $c$, which is passed through the bearing or nut and has its ends bent away from the same as illustrated.

E, indicates a pipe section, and F, indicates a cushion or cushion washer which surrounds the pipe section and bears against the broken surface of the bowl. This cushion or washer may be formed from rubber or other yielding or elastic substance, and may be secured upon the pipe section in any approved manner as by the collar flanges $i$, and it serves to render the connection between the pipe section and the broken surface of the bowl, water-tight, and also serves to render such connection yielding and cushions the bowl so as to prevent further breakage of the same, in case the pipe section is jarred or moved or the bowl sinks slightly from its original position.

D, indicates the bolt or rod for connecting the pipe section E, to the nut or bearing C, and the bowl. This rod or bolt D, takes through the said pipe section E, and is provided with threads to engage the threaded aperture or bore $d$, of the nut or bearing, whereby it will be seen that the connection between the pipe section and the boss may be readily tightened or loosened by simply turning the said rod or bolt.

In the practice of the invention the nut or bearing B, is pushed through the opening $a$, (by the bolt F, or other implement as shown in Fig. 2,) to the position shown in Fig. 1, when the spring C, engaging the flushing rim will press the nut or bearing against the inner side of the bowl and securely hold it in such position. The bolt F, is then disconnected from the nut or bearing, and after being passed through the pipe section E, is again screwed into the nut or bearing so as to carry the cushion F, against the broken surface of the bowl and effect a water tight, though yielding connection.

As is well known to those skilled in the art to which my invention appertains, the bosses or arms of water-closet bowls are very liable to be broken off by careless handling or by careless or incapable plumbers in effecting a connection of the flushing pipe. When broken through carelessness the bowls are returned to the manufacturer on the ground that they were faulty, and he must needs furnish a new bowl without cost to the plumber or lose his trade. With my improved coupling, as good a connection may be made with a broken bowl as with a complete one, and it will therefore be seen that it obviates the great loss to the manufacturer, incident to the return of a large number of bowls.

In Fig. 3, of the drawings, I have illustrated a construction which embodies in lieu of the bent pipe section E, a straight section E', and in lieu of the bolt D, (before described,) a bolt D', which has a head $m$, at its outer end designed to engage the outer end of the pipe section so as to hold it against the bowl. The pipe section of this modified construction may have threads for the engagement of another pipe, and said pipe section and the bolt D', may be employed instead of the pipe section E, and rod D, when desired.

While I have in some respects specifically described the construction and relative arrangement of the parts of my improved coupling, I do not desire to be understood as confining myself to such construction and arrangement as such changes or modification may be made in practice as fairly fall within the scope of the invention.

Having described my invention, what I claim is—

1. The herein described coupling, comprising a nut or bearing having a spring adapted to engage the flushing rim of a bowl or hopper so as to hold the nut or bearing in position in the bowl or hopper, a pipe section and a connection between the pipe section and the nut or bearing, substantially as specified.

2. The herein described coupling comprising a nut or bearing having a spring adapted to engage the flushing rim of a bowl or hopper so as to hold the nut or bearing in position in the bowl or hopper, a pipe section, a cushion carried by the pipe section and adapted to bear against the bowl or hopper, and a threaded bolt connecting the pipe section and the nut or bearing, substantially as specified.

In testimony whereof I affix my signature in presence of two witnesses.

JOSEPH H. SAVILL.

Witnesses:
W. SAVILL,
K. F. MATTHEWS.